US011169391B2

(12) United States Patent
Fattal et al.

(10) Patent No.: US 11,169,391 B2
(45) Date of Patent: Nov. 9, 2021

(54) MULTIVIEW BACKLIGHT, MODE-SWITCHABLE BACKLIGHT, AND 2D/3D MODE-SWITCHABLE DISPLAY

(71) Applicant: LEIA INC., Menlo Park, CA (US)

(72) Inventors: David A. Fattal, Mountain View, CA (US); Ming Ma, Palo Alto, CA (US)

(73) Assignee: LEIA INC., Menlo Park, CA (US)

(*) Notice: Subject to any disclaimer, the term of this patent is extended or adjusted under 35 U.S.C. 154(b) by 121 days.

(21) Appl. No.: 16/591,551

(22) Filed: Oct. 2, 2019

(65) Prior Publication Data

US 2020/0033621 A1    Jan. 30, 2020

Related U.S. Application Data

(63) Continuation of application No. PCT/US2017/026728, filed on Apr. 8, 2017.

(51) Int. Cl.
*G02B 6/10* (2006.01)
*G02B 30/25* (2020.01)
(Continued)

(52) U.S. Cl.
CPC .............. *G02B 30/25* (2020.01); *G02B 6/005* (2013.01); *G02B 6/0056* (2013.01);
(Continued)

(58) Field of Classification Search
CPC .... G02B 6/005; G02B 6/0056; G02B 6/0068; G02B 27/288; G02B 30/25; G02B 30/33;
(Continued)

(56) References Cited

U.S. PATENT DOCUMENTS 7,278,775 B2   10/2007 Yeo et al.
7,527,416 B2    5/2009 Lin
(Continued)

FOREIGN PATENT DOCUMENTS

CN    105739108 A    7/2016
JP    2012168544 A   9/2012
(Continued)

OTHER PUBLICATIONS

International Search Report and Written Opinion (ISRWO) by International Searching Authority (ISA) Korean Intellectual Property Office (KIPO), dated Jan. 2, 2018 (18 pages) for counterpart parent International (PCT) Application No. PCT/US2017/026728.
(Continued)

*Primary Examiner* — Audrey Y Chang
(74) *Attorney, Agent, or Firm* — J. Michael Johnson

(57) ABSTRACT

A multiview backlight and mode-switchable backlight employ a planar backlight to emit scattered light and light-blocking layer having a plurality of apertures to provide a plurality of directional light beams from the scattered light. The mode-switchable backlight further includes another planar backlight configured to provide diffuse light in a two-dimensional (2D) operational mode, the plurality of directional light beams being provided in a three-dimensional (3D) mode. A 2D/3D mode-switchable display includes the mode-switchable backlight and a light valve array. A method of backlight operation includes directing scattered light from a planar backlight toward a light-blocking layer having a plurality of apertures and providing a plurality of directional light beams using an aperture of the aperture plurality.

15 Claims, 8 Drawing Sheets

(51) Int. Cl.
*F21V 8/00* (2006.01)
*G02B 27/28* (2006.01)
*G09G 3/00* (2006.01)
*G09G 3/34* (2006.01)
*G09G 3/36* (2006.01)

(52) U.S. Cl.
CPC ......... *G02B 6/0068* (2013.01); *G02B 27/288* (2013.01); *G09G 3/003* (2013.01); *G09G 3/344* (2013.01); *G09G 3/3406* (2013.01); *G09G 3/3607* (2013.01); *G09G 2320/068* (2013.01); *G09G 2320/0646* (2013.01)

(58) Field of Classification Search
CPC .... H04N 13/359; H04N 13/356; H04N 13/32; G09G 3/003; G09G 3/3406; G09G 3/344; G09G 3/3607; G09G 2320/0646; G09G 2320/068
USPC ............ 359/465, 462, 464; 349/15; 385/146
See application file for complete search history.

(56) References Cited

U.S. PATENT DOCUMENTS

| | | | |
|---|---|---|---|
| 7,567,307 B2* | 7/2009 | Kim | H04N 13/359 349/15 |
| 7,633,586 B2 | 12/2009 | Winlow et al. | |
| 9,128,226 B2 | 9/2015 | Fattal et al. | |
| 9,201,270 B2 | 12/2015 | Fattal et al. | |
| 9,298,168 B2 | 3/2016 | Taff et al. | |
| 9,348,160 B2 | 5/2016 | Hsu | |
| 9,389,415 B2 | 7/2016 | Fattal et al. | |
| 9,459,461 B2 | 10/2016 | Santori et al. | |
| 9,557,466 B2 | 1/2017 | Fattal | |
| 9,785,119 B2 | 10/2017 | Taff et al. | |
| 10,798,371 B2 | 10/2020 | Fattal | |
| 2004/0130503 A1 | 7/2004 | Hamagishi et al. | |
| 2006/0056791 A1* | 3/2006 | Tzschoppe | H04N 13/359 385/146 |
| 2006/0262376 A1 | 11/2006 | Mather et al. | |
| 2007/0013624 A1* | 1/2007 | Bourhill | G02B 27/06 345/84 |
| 2007/0040780 A1 | 2/2007 | Gass et al. | |
| 2007/0139957 A1 | 6/2007 | Haim et al. | |
| 2007/0147079 A1 | 6/2007 | Wu et al. | |
| 2008/0112187 A1 | 5/2008 | Katsumata et al. | |
| 2009/0067156 A1 | 3/2009 | Bonnett et al. | |
| 2009/0225244 A1* | 9/2009 | Wang | H04N 13/359 349/15 |
| 2010/0039366 A1 | 2/2010 | Hardy | |
| 2010/0141868 A1 | 6/2010 | St. Hilaire et al. | |
| 2012/0033442 A1* | 2/2012 | Kamikatano | G02B 30/27 362/602 |
| 2012/0327076 A1 | 12/2012 | Yang | |
| 2013/0169518 A1 | 7/2013 | Wu et al. | |
| 2013/0335538 A1 | 12/2013 | Shestak et al. | |
| 2014/0085570 A1 | 3/2014 | Kuwata et al. | |
| 2015/0015681 A1* | 1/2015 | Kim | H04N 13/302 348/51 |
| 2015/0036068 A1 | 2/2015 | Fattal et al. | |
| 2015/0150149 A1 | 5/2015 | Yamashirodani | |
| 2015/0346498 A1 | 12/2015 | Zhong et al. | |
| 2016/0061415 A1 | 3/2016 | Chen | |
| 2017/0031170 A1 | 2/2017 | Yang et al. | |
| 2017/0059961 A1 | 3/2017 | Park et al. | |
| 2017/0329149 A1 | 11/2017 | Fattal | |
| 2018/0011237 A1 | 1/2018 | Fattal | |
| 2018/0156963 A1 | 6/2018 | Fattal | |
| 2018/0188441 A1 | 7/2018 | Fattal | |
| 2018/0188691 A1 | 7/2018 | Fattal | |
| 2018/0196194 A1 | 7/2018 | Fattal | |
| 2018/0299608 A1 | 10/2018 | Fattal et al. | |
| 2019/0018186 A1 | 1/2019 | Fattal | |
| 2019/0025494 A1 | 1/2019 | Fattal et al. | |
| 2019/0155105 A1 | 5/2019 | Aieta et al. | |

FOREIGN PATENT DOCUMENTS

| | | |
|---|---|---|
| WO | 2016160048 A1 | 10/2016 |
| WO | 2018067381 A1 | 4/2018 |
| WO | 2018140063 A1 | 8/2018 |
| WO | 2018182917 A1 | 10/2018 |
| WO | 2018182991 A1 | 10/2018 |
| WO | 2018186955 A1 | 10/2018 |
| WO | 2018187019 A1 | 10/2018 |
| WO | 2019125390 A1 | 6/2019 |
| WO | 2019125479 A1 | 6/2019 |
| WO | 2019147276 A1 | 8/2019 |

OTHER PUBLICATIONS

Fattal, David, et al., "A multi-directional backlight for a wide-angle, glasses-free three-dimensional display," Nature, Mar. 21, 2013, pp. 348-351, vol. 495, Macmillan Publishers Limited, 2013.

Reichelt, et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis, et al., "Collimated light from a waveguide for a display backlight," Optics Express, Oct. 2009, pp. 19714-19719, vol. 17, No. 22.

Xu, et al., "Computer-Generated Holography for Dynamic Display of 3D Objects with Full Parallax," International Journal of Virtual Reality, 2009, pp. 33-38, vol. 8, No. 2.

Son, Jung-Young, et al., "Three-Dimensional Imaging Methods Based on Multiview Images," IEEE/OSA Journal of Display Technology, Sep. 2005, pp. 125-140, vol. 1, No. 1.

Kee, Edwin, "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Maimone, A., et al., Pinlight Displays: Wide Field of View Augmented Reality Eyeglasses using Defocused Point Light Sources, ACM Transactions on Graphics, Jul. 2014, pp. 89.1-89.11, vol. 33, No. 4, Article 89.

Liu, Chun-Wei, et al., Sub-wavelength gratings fabricated on a light bar by roll-to-roll UV embossing process, Optics Express, Jun. 6, 2011, pp. 11299-11311, vol. 19, No. 12.

Kim, Yunhee, et al., Point light source integral imaging with improved resolution and viewing angle by the use of electrically movable pinhole array, Optics Express, Dec. 24, 2007, pp. 18253-18267, vol. 15, No. 26, (c) 2007 OSA.

Choi, Heejin, et al., A thin 2D/3D convertible integral imaging system using a pinhole array on a polarizer, Optics Express, Jun. 12, 2006, pp. 5183-5190, vol. 14, No. 12, (c) 2006 OSA.

Jung, Jae-Hyun, et al., Integral imaging using a color filter pinhole array on a display panel, Optics Express, Aug. 13, 2012, pp. 18744-18756, vol. 20, No. 17, (c) 2012 OSA.

* cited by examiner

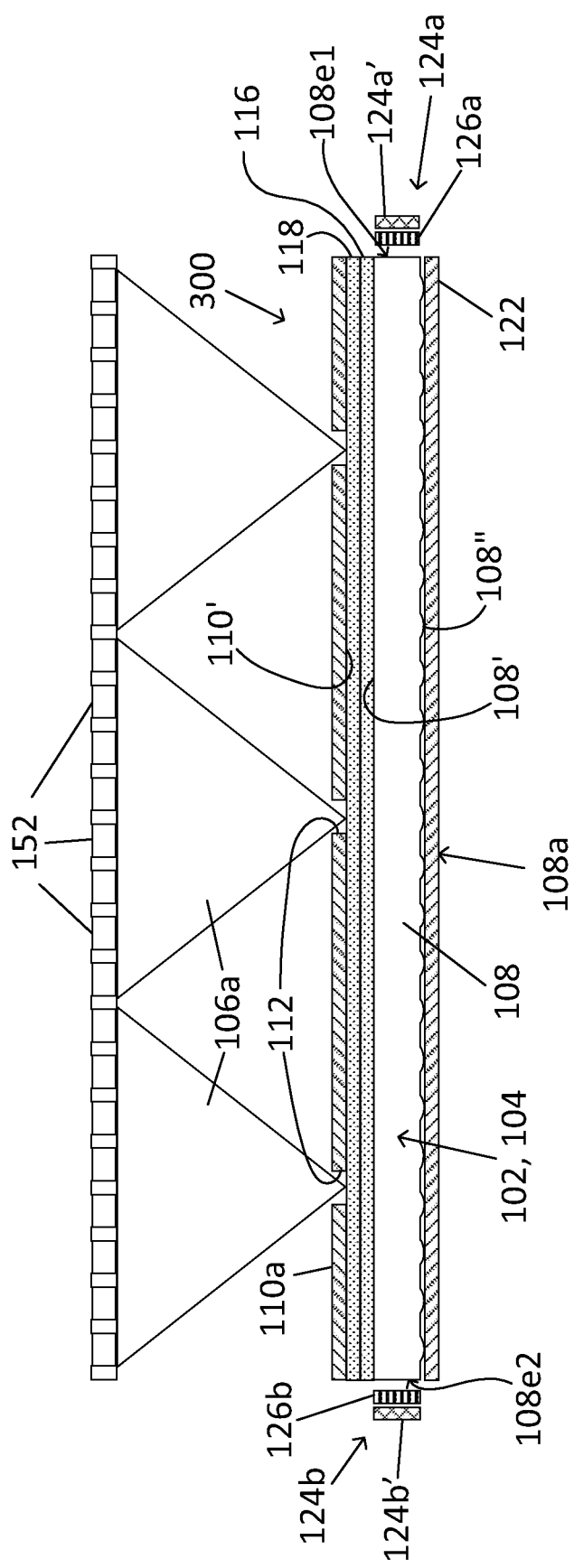

MULTIVIEW BACKLIGHT, MODE-SWITCHABLE BACKLIGHT, AND 2D/3D MODE-SWITCHABLE DISPLAY

CROSS-REFERENCE TO RELATED APPLICATIONS

This application is a continuation patent application of and claims the benefit of priority to International Application No. PCT/US2017/026728, filed Apr. 8, 2017, the entirety of which is incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which:

FIGS. 3A-3B illustrate a side view a second example of a portion of a 2D/3D mode-switchable backlight, operating in 3D mode (FIG. 3A) and in 2D mode (FIG. 3B), according to an embodiment consistent with the principles described herein.

Figure 1A:
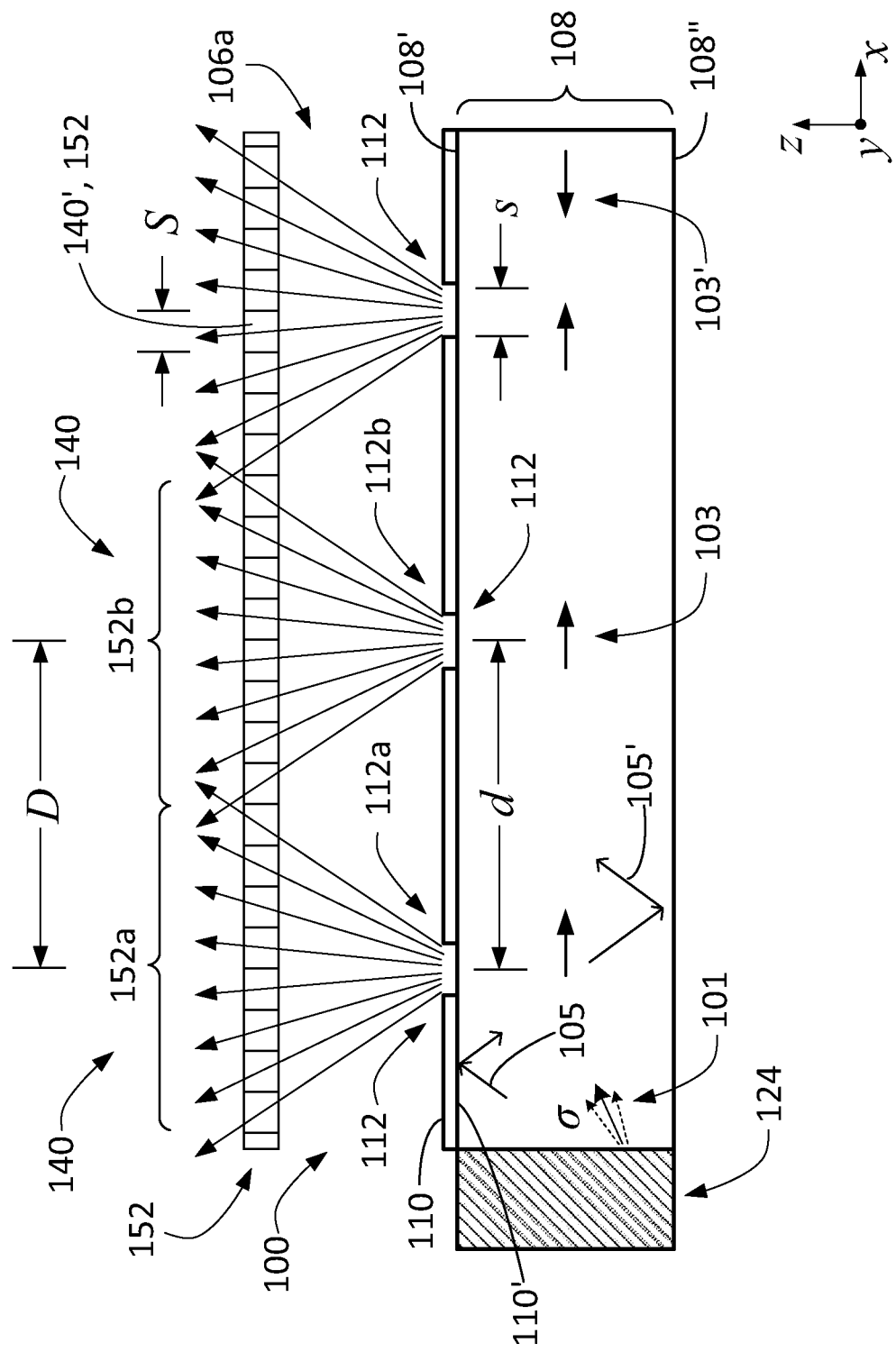
FIG. 1A illustrates a side view of a multiview backlight, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Embodiments and examples in accordance with the principles described herein provide for a multiview backlight comprising a planar backlight configured to emit scattered light and a light-blocking layer having a plurality of apertures adjacent to a surface of the planar backlight. The apertures are configured to allow a portion of light to pass through as a plurality of directional light beams. The directional light beams may have directions corresponding to view directions of a multiview display, for example.

Embodiments and examples in accordance with the principles described herein also provide a 2D/3D mode-switchable display that supports switching between the display of two-dimensional (2D) information and three-dimensional (3D) information. In particular, in accordance with the principles described herein, information may be selectively displayed in either a 2D operational mode or a 3D operational mode. The 3D operational mode may be employed to present images and similar information in conjunction with a so-called 'glasses-free' or autostereoscopic display system, while the 2D operational mode may be used to present information that either lacks or at least does not benefit from a third dimension (e.g., information such as text, 2D images, etc.). Moreover, the switchable 2D and 3D operational modes may be provided on the same display unit or system, according to various examples of the principles described herein. A mode-switchable display system that is capable of selectively displaying both 2D information and 3D information on the same display system may facilitate adapting a single display system to a much wider range of differing data presentation requirements than is possible using either a 2D display alone or a 3D display alone.

In some embodiments of the principles described herein, color separation problems often experienced in grating-based backlight and other similar backlight configuration, may be mitigated or even eliminated due to the use of a white or substantially white light source and the absence of a grating for scattering light. Further, display employing various backlight embodiments described herein may exhibit excellent brightness uniformity due to substantially uniform illumination of the backlights described below. Finally, various embodiments may employ only simple collimation, e.g., on the order of ±30°, which may be readily achieved through the use of prism films, etc.

Herein, a 'multiview display' is defined as an electronic display or display system configured to provide different views of a multiview image in different view directions. Further herein, the term 'multiview' as used in the terms 'multiview image' and 'multiview display' is defined as a plurality of views representing different perspectives or including angular disparity between views of the view plurality. In addition, the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of sub-pixels representing 'view' pixels in each of a similar plurality of different views of a multiview display. In particular, a multiview pixel may have an individual sub-pixel corresponding to or representing a view pixel in each of the different views of the multiview image. Moreover, the sub-pixels of the multiview pixel are so-called 'directional pixels' in that each of the sub-pixels is associated with a predetermined view direction of a corresponding one of the different views, by definition. Further, according to various examples and embodiments, the different view pixels represented by the sub-pixels of a multiview pixel may have equivalent or at least substantially similar locations or coordinates in each of the different views. For example, a first multiview pixel may have individual sub-pixels corresponding to view pixels located at $\{x_1, y_1\}$ in each of the different views of a multiview image, while a second multiview pixel may have individual sub-pixels corresponding to view pixels located at $\{x_2, y_2\}$ in each of the different views, and so on. According to various embodiments described herein, a 'sub-pixel' may be equivalent to a light valve of a light valve array used to implement the multiview pixels of the multiview display. As such, the terms 'sub-pixel,' 'view pixel,' and 'light valve' may be used interchangeably herein.

Herein, a 'light guide' is defined as a structure that guides light within the structure using total internal reflection. In particular, the light guide may include a core that is substantially transparent at an operational wavelength of the light guide. In various embodiments, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces both are separated from one another and may be substantially parallel to one another in at least a differential sense, according to some embodiments. That is, within any differentially small section of the plate light guide, the top and bottom surfaces are substantially parallel or co-planar.

In some embodiments, a plate light guide may be substantially flat (i.e., confined to a plane) and so the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

In other embodiments, the plate light guide may have a wedge shape in which a space between the top and bottom surfaces changes as a function of distance across the plate light guide. In particular, in some embodiments, the wedge shape may comprise a top surface to bottom surface spacing that increases with distance from an input end (e.g., adjacent to a light source) to an output or terminal end of the wedge-shaped plate light guide. Such a wedge-shaped light guide may provide collimation (e.g., vertical collimation) of light introduced at the input end, for example. In other embodiments, the wedge shape may comprise spacing of a top surface to bottom surface that decreases with distance from an input end (e.g., adjacent to a light source) to an output or terminal end of the wedge-shaped plate light guide. Such a wedge-shaped light guide may serve as a light extraction feature to facilitate scattering of light out of the wedge light guide, for example.

Herein, a 'light source' is defined as a source of light (e.g., an apparatus or device that produces and emits light). For example, the light source may be a light emitting diode (LED) that emits light when activated. Herein, a light source may be substantially any source of light or optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light).

Further, as used herein, the article 'a' is intended to have its ordinary meaning in the patent arts, namely 'one or more'. For example, 'an aperture' means one or more apertures and as such, 'the aperture' means 'the aperture(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

According to some embodiments of the principles described herein, a backlight and more particularly a multiview backlight is provided. FIG. 1A illustrates a side view of a multiview backlight 100 in an example, according to an embodiment consistent with the principles described herein. The multiview backlight 100 illustrated in FIG. 1A is configured to emit or provide a plurality of directional light beams 106a having different principal angular directions from one another (e.g., as a light field). In particular, the provided plurality of directional light beams 106a are directed away from the multiview backlight 100 in different principal angular directions corresponding to respective view directions of a multiview display, according to various embodiments. In some embodiments, the directional light beams 106a may be modulated (e.g., using light valves, as described below) to facilitate the display of information having 3D content.

As illustrated in FIG. 1A, the multiview backlight 100 comprises a light guide 108. The light guide 108 may be a plate light guide 108, according to some embodiments. The light guide 108 is configured to guide light along a length of the light guide 108 as guided light 101. For example, the light guide 108 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 101 according to one or more guided modes of the light guide 108, for example.

In some embodiments, the light guide 108 may be a slab or plate optical waveguide comprising an extended, substantially planar sheet of optically transparent, dielectric material. The substantially planar sheet of dielectric material is configured to guide the guided light 101 using total internal reflection. According to various examples, the optically transparent material of the light guide 108 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 108 may further include a cladding layer (not illustrated) on at least a portion of a surface (e.g., one or both of a first surface 108' and a second surface 108") of the light guide 108. The cladding layer may be used to further facilitate total internal reflection, according to some examples.

Further, according to some embodiments, the light guide 108 is configured to guide the guided light 101 according to total internal reflection at a non-zero propagation angle between a first surface 108' (e.g., 'front' surface or side) and a second surface 108" (e.g., 'back' surface or side) of the light guide 108. In particular, the guided light 101 may propagate by reflecting or 'bouncing' between the first (front) surface 108' and the second (back) surface 108" of the light guide 108 at the non-zero propagation angle. In some embodiments, a plurality of guided light beams comprising different colors of light may be guided by the light guide 108 at respective ones of different color-specific, non-zero propagation angles. Note, the non-zero propagation angle is not illustrated in FIG. 1A for simplicity of illustration. However, a bold arrow depicting a propagation direction 103 illustrates a general propagation direction of the guided light 101 along the light guide length in FIG. 1A.

As defined herein, a 'non-zero propagation angle' is an angle relative to a surface (e.g., the first surface 108' or the second surface 108") of the light guide 108. Further, the non-zero propagation angle is both greater than zero and less than a critical angle of total internal reflection within the light guide 108, according to various embodiments. For example, the non-zero propagation angle of the guided light 101 may be between about 10° and about 50° or, in some examples, between about 20° and about 40°, or between about 25° and about 35°. For example, the non-zero propagation angle may be about 30°. In other examples, the non-zero propagation angle may be about 20°, or about 25°, or about 35°. Moreover, a specific non-zero propagation angle may be chosen (e.g., arbitrarily) for a particular implementation as long as the specific non-zero propagation angle is chosen to be less than the critical angle of total internal reflection within the light guide 108.

The multiview backlight 100 may further comprise a light source 124. According to various embodiments, the light source 124 is configured to provide the light to be guided within light guide 108. In particular, the light source 124 may be located adjacent to an entrance surface or end (input end) of the light guide 108. In various embodiments, the light source 124 may comprise substantially any source of light (e.g., optical emitter) including, but not limited to, one or more light emitting diodes (LEDs) or a laser (e.g., laser diode). In some embodiments, the light source 124 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 124 may be a substantially broadband light source configured to provide substantially broadband or polychromatic light. For example, the light source 124 may provide white light. In some embodiments, the light source 124 may comprise a plurality of different optical emitters configured to provide different colors of light. The different optical emitters may be configured to provide light having different, color-specific, non-zero propagation angles of the guided light corresponding to each of the different colors of light.

The guided light 101 in the light guide 108 may be introduced or coupled into the light guide 108 at the non-zero propagation angle (e.g., about 30° to about 35°) by the light source 124. One or more of a lens, a mirror or similar reflector (e.g., a tilted collimating reflector), and a prism (not illustrated) may facilitate coupling light into an input end of the light guide 108 as the guided light 101 at the non-zero propagation angle, for example. Once coupled into the light guide 108, the guided light 101 propagates along the light guide 108 in a direction that may be generally away from the input end (e.g., illustrated by bold arrows pointing along an x-axis in FIG. 1A).

Further, the guided light 101 guided light 101 produced by coupling light into the light guide 108 may be a collimated light, according to various embodiments. Herein, a 'collimated light' or 'collimated light beam' is generally defined as a beam of light in which rays of the light beam are substantially parallel to one another within the light beam (e.g., the guided light 101). Further, rays of light that diverge or are scattered from the collimated light beam are not considered to be part of the collimated light beam, by definition herein. In some embodiments, the multiview backlight 100 may include a collimator, such as a lens, reflector or mirror (e.g., tilted collimating reflector) to collimate the light, e.g., from a light source. In some embodiments, the light source 124 may comprise the collimator. The guided light 101 may be collimated according to or having a collimation factor σ by the collimator, in various embodiments.

In some embodiments, the light guide 108 may be configured to 'recycle' the guided light 101. In particular, the guided light 101 that has been guided along the light guide length may be redirected back along that length in another propagation direction 103' that differs from the propagation direction 103. For example, the light guide 108 may include a reflector (not illustrated) at an end of the light guide 108 opposite to an input end adjacent to the light source. The reflector may be configured to reflect the guided light 101 back toward the input end as recycled guided light. Recycling guided light 101 in this manner may increase a brightness of the multiview backlight 100 (e.g., an intensity of the directional light beams 106a) by making guided light available more than once, for example, to apertures, described below. In FIG. 1A, a bold arrow indicating a propagation direction 103' of recycled guided light (e.g., directed in a negative X-direction) illustrates a general propagation direction of the recycled guided light within the light guide 108. Alternatively (e.g., as opposed to recycling guided light), guided light 101 propagating in the other propagation direction 103' may be provided by introducing light into the light guide 108 with the other propagation direction 103' (e.g., in addition to guided light 101 having the propagation direction 103).

As illustrated in FIGS. 1A and 1n accordance with the principles disclosed herein, the multiview backlight 100 further comprises a light-blocking layer 110. The light-blocking layer 110 has a plurality of apertures 112 spaced apart from one another along the light guide length. In particular, the apertures 112 of the aperture plurality are separated from one another by a finite space and represent individual, distinct openings along a the light-blocking layer 110. That is, by definition herein, the apertures 112 of the aperture plurality are spaced apart from one another according to a finite (i.e., non-zero) inter-aperture distance (i.e., a finite center-to-center distance).

According to some embodiments, the apertures 112 of the aperture plurality may be arranged in either a one-dimensional (1D) array or two-dimensional (2D) array along or across the light-blocking layer 110. For example, the plurality of apertures 112 may be arranged as a linear 1D array. In another example, the plurality of apertures 112 may be arranged as a rectangular 2D array or as a circular 2D array. Further, the array (i.e., 1D or 2D array) may be a regular or uniform array, in some examples. In particular, an inter-aperture distance (e.g., center-to-center distance or spacing) between the apertures 112 may be substantially uniform or constant across the array. In other examples, the inter-element distance between the apertures 112 may be varied one or both of across the array and along the length of the light guide 108.

According to various embodiments, an aperture 112 of the plurality of apertures 112 is configured to emit a portion of the guided light 101 as the plurality of directional light beams 106a. In particular, FIG. 1A illustrates the directional light beams 106a as a plurality of diverging arrows depicted as being directed away from the first (or front) surface 108' of the light guide 108. Further, a size of the aperture 112 is comparable to a size of a sub-pixel 140' in a multiview pixel 140 of a multiview display, according to various embodiments.

The multiview pixels 140 are illustrated in FIG. 1A along with the multiview backlight 100 for the purpose of facilitating discussion. Herein, the 'size' may be defined in any of a variety of manners to include, but not be limited to, a length, a width or an area. For example, the size of a sub-pixel 140' may be a length thereof and the comparable size of the aperture 112 may also be a length of the aperture 112. In another example, size may refer to an area such that an area of the aperture 112 may be comparable to an area of the sub-pixel 140'.

In some embodiments, the size of the aperture 112 is comparable to the sub-pixel size such that the aperture size is between about fifty percent (50%) and about two hundred percent (200%) of the sub-pixel size. For example, if the aperture size is denoted 's' and the sub-pixel size is denoted 'S' (e.g., as illustrated in FIG. 1A), then the aperture size s may be given by equation (1) as $$\tfrac{1}{2}S \leq s \leq 2S. \tag{1}$$

In other examples, the aperture size is greater than about 60% of the sub-pixel size, or about 70% of the sub-pixel size, or greater than about 80% of the sub-pixel size, or greater than about 90% of the sub-pixel size, and the aperture size is less than about 180% of the sub-pixel size, or less than about 160% of the sub-pixel size, or less than about 140% of the sub-pixel size, or less than about 130% of the sub-pixel size. For example, having a 'comparable size', the aperture size may be between about 75% and about 150% of the sub-pixel size. In another example, the aperture 112 may be comparable in size to the sub-pixel 140' where the aperture size is between about 125% and about 85% of the sub-pixel size. According to some embodiments, the comparable sizes of the aperture 112 and the sub-pixel 140' may be chosen to reduce, or in some examples to minimize, dark zones between views of the multiview display, while at the same time reducing, or in some examples minimizing, an overlap between views of the multiview display.

FIG. 1A also illustrates an array of light valves 152 configured to modulate the directional light beams 106a of the directional light beam plurality emitted by the multiview backlight 100. The light valve array may be part of a multiview display that employs the multiview backlight 100, for example, and is illustrated in FIG. 1A along with the multiview backlight 100 for the purpose of facilitating discussion herein.

As illustrated in FIG. 1A, different ones of the directional light beams 106a having different principal angular directions pass through and may be modulated by different ones of the light valves 152 in the light valve array. Further, as illustrated, a light valve 152 of the array corresponds to a sub-pixel 140', and a set of the light valves 152 corresponds to a multiview pixel 140 of a multiview display. In particular, a different set of light valves 152 of the light valve array is configured to receive and modulate the directional light beams 106a from different ones of the apertures 112, i.e., there is one unique set of light valves 152 for each aperture 112, as illustrated. In various embodiments, different types of light valves may be employed as the light valves 152 of the light valve array including, but not limited to, one or more of liquid crystal light valves, electrophoretic light valves, and light valves based on electrowetting.

In particular, as depicted in FIG. 1A, a first light valve set 152a is configured to receive and modulate the directional light beams 106a from a first aperture 112a, while a second light valve set 152b is configured to receive and modulate the directional light beams 106a from a second aperture 112b. Thus, each of the light valve sets (e.g., the first and second light valve sets 152a, 152b) in the light valve array corresponds, respectively, to a different aperture 112, with individual light valves 152 of the light valve sets corresponding to the sub-pixels 140' of the respective multiview pixels 140, as illustrated in FIG. 1A.

Note that, as illustrated in FIG. 1A, the size of a sub-pixel 140' may correspond to a size of a light valve 152 in the light valve array. In other examples, the sub-pixel size may be defined as a distance (e.g., a center-to-center distance) between adjacent light valves 152 of the light valve array. For example, the light valves 152 may be smaller than the center-to-center distance between the light valves 152 in the light valve array. The sub-pixel size may be defined as either the size of the light valve 152 or a size corresponding to the center-to-center distance between the light valves 152, for example.

In some embodiments, a relationship between the apertures 112 of the plurality and corresponding multiview pixels 140 (e.g., sets of light valves 152) may be a one-to-one relationship. That is, there may be an equal number of multiview pixels 140 and apertures 112. In other embodiments (not illustrated), the number of multiview pixels 140 and apertures 112 may differ from one another.

In some embodiments, an inter-aperture distance (e.g., center-to-center distance) between a pair of adjacent apertures 112 of the plurality may be equal to an inter-pixel distance (e.g., a center-to-center distance) between a corresponding adjacent pair of multiview pixels 140, e.g., represented by light valve sets. For example, as illustrated in FIG. 1A, a center-to-center distance d between the first aperture 112a and the second aperture 112b is substantially equal to a center-to-center distance D between the first light valve set 152a and the second light valve set 152b. In other embodiments (not illustrated), the relative center-to-center distances of pairs of apertures 112 and corresponding light valve sets may differ, e.g., the apertures 112 may have an inter-aperture spacing (i.e., center-to-center distance d) that is one of greater than or less than a spacing (i.e., center-to-center distance D) between light valve sets representing the multiview pixels 140.

In some embodiments, a shape of the aperture 112 is analogous to a shape of the multiview pixel 140 or equivalently, a shape of a set (or 'sub-array') of the light valves 152 corresponding to the multiview pixel 140. For example, the aperture 112 may have a square shape and the multiview pixel 140 (or an arrangement of a corresponding set of light valves 152) may be substantially square. In another example, the aperture 112 may have a rectangular shape, i.e., may have a length or longitudinal dimension that is greater than a width or transverse dimension. In this example, the multiview pixel 140 (or equivalently the arrangement of the set of light valves 152) corresponding to the aperture 112 may have an analogous rectangular shape. In yet other examples (not illustrated), the apertures 112 and the corresponding multiview pixels 140 have various shapes including or at least approximated by, but not limited to, a triangular shape, a hexagonal shape, and a circular shape.

Further (e.g., as illustrated in FIG. 1A), each aperture 112 is configured to provide directional light beams 106a to one and only one multiview pixel 140, according to some embodiments. In particular, for a given one of the apertures 112, the directional light beams 106a having different principal angular directions corresponding to the different views of the multiview display are substantially confined to a single corresponding multiview pixel 140 and the sub-pixels 140' thereof, i.e., a single set of light valves 152 corresponding to the aperture, as illustrated in FIG. 1A. As such, each aperture 112 of the multiview backlight 100 provides a corresponding set of directional light beams 106a that has a set of the different principal angular directions corresponding to the different views of the multiview display (i.e., the set of directional light beams 106a contains a light beam having a direction corresponding to each of the different view directions).

In FIG. 1A, the light-blocking layer 110 is between the front surface 108' of the light guide 108 and the light valves 152 and is configured to block light from the light guide 108 except for the apertures 112, which allow light to pass through the light-blocking layer 110 as directional light beams 106a. In some embodiments, the light-blocking layer 110 is a reflective light-blocking layer. In particular, a back surface 110' of the reflective light-blocking layer 110 that is adjacent to the light guide 108 may be configured to reflect light 105 back into the light guide 108 as reflected light. Such reflected light may then be reflected off the back surface 108" of the light guide 108 as additional recycled light 105' (e.g., in addition to the recycled light described above). This additional recycled light 105' may further increase brightness of the multiview backlight 100 (e.g., an intensity of the directional light beams 106a) by making guided light available more than once, for example, to the apertures 112. The back surface 108" of the light guide 108 may be provided with a reflector (not illustrated in FIG. 1A, but shown in FIG. 1B as element 122) for further enhancement of the light recycling.

Figure 1B:
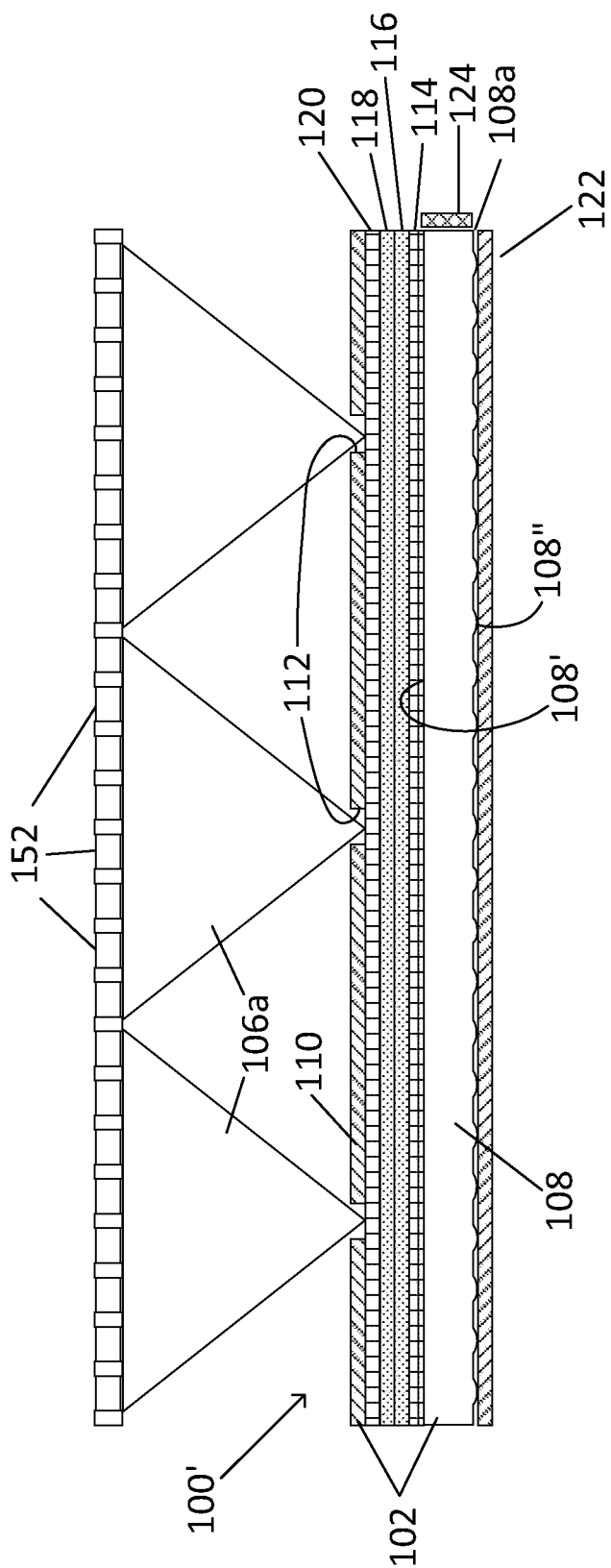
FIG. 1B illustrates a side view of a multiview backlight in an example, according to another embodiment consistent with the principles described herein.

FIG. 1B illustrates a side view of a multiview backlight 100' in an example, according to another embodiment consistent with the principles described herein. The multiview backlight 100' may be part of an electronic display that includes an array of light valves 152, such as, but not limited to, liquid crystal display (LCD) elements. The array of light valves 152 is configured to modulate the directional light beams 106a emitted by the multiview backlight 100'. The multiview backlight 100' shown in FIG. 1B may be a more detailed version of the backlight 100 shown in FIG. 1A in that it depicts additional layers, such as prism and diffuser layers, discussed below.

The multiview backlight 100' depicted in FIG. 1B comprises a planar backlight 102. The planar backlight 102 comprises a light guide 108 and a light-blocking layer 110 having a plurality of apertures 112. In some embodiments, the light-blocking layer 110 may be a reflective light-blocking layer 110 (e.g., as described above with respect to FIG. 1A), while in other embodiments the light-blocking layer 110 may be non-reflective or at least substantially non-reflective. For example, the light-blocking layer 110 may be an absorptive light-blocking layer, in some embodiments. For clarity, in FIG. 1B (and also in FIGS. 2A and 3A described below), the directional light beams 106a are represented as V-shaped beams emanating from the apertures 112. However, it will be understood that this is simply a representation of the directional light beams 106a having different principal angular directions shown in FIG. 1A.

The light guide 108 may further include light extraction features 108a. Light extraction features 108a can include any of a number of configurations for extracting light from the light guide 108. For example, diffusing white spots on the back surface 108" of the light guide 108 may be used. Additional examples of light extraction features 108a include diffraction gratings on the front surface 108' or the back surface 108", whether uniform or chirped. The spacing or grating pitch may be sub-wavelength (i.e., less than a wavelength of the guided light). The gratings may comprise grooves in the surface 108', 108" of the light guide 108 or ridges on the surface 108', 108". Yet another example of light extraction features involves providing a wedge shape to the light guide 108, so that the back surface 108" is sloped away from the front surface 108' as light traverses the light guide. Further examples of light extraction features 108a include micro-reflective elements, such as prismatic cavities or semi-spherical elements, in the back surface 108". FIG. 1B illustrates the light extraction features 108a as a plurality of semi-spherical elements, by way of example and not limitation.

In some embodiments, as shown in FIG. 1A, the light-blocking layer 110 with apertures 112 is on the first surface 108' of the light guide 108 and may include a reflective surface (or simply be reflective) to reflect light back into the planar backlight 102, as described in greater detail below. In other embodiments, as shown in FIG. 1B, the light-blocking layer 110 with apertures 112 is separated from the first surface 108' of the light guide 108 by one or more of several layers 114-120, as described below. In either case, each aperture 112 of the plurality of apertures is configured to receive scattered light from the light guide 108 and to provide the plurality of directional light beams 106a from the received scattered light.

The multiview backlight 100' illustrated in FIG. 1B further includes a light diffuser film 114, disposed on the planar backlight 102. Further, the illustrated multiview backlight 100' also includes a pair of prism films 116, 118, e.g., oriented orthogonal to each other. For example, the first prism film 116 may have a first orientation, for example, vertical, and the second prism film 118 may have a second orientation, for example, horizontal, one disposed on the other to form a stack of the two prism films 116, 118. The stack of the two prism films 116, 118 may be disposed on the light diffuser film 114. In addition, a reflective polarizer film 120 is illustrated in FIG. 1B disposed on the stack of the two prism films 116, 118. The light-blocking layer 110 with apertures 112 is then disposed on the reflective polarizer film 120, as illustrated. Each of the two prism films 116, 118 and the reflective polarizer film 120 may be employed to enhance brightness of the multiview backlight 100' and more particularly to enhance brightness of the directional light beams 106a, according to various embodiments. In this connection, it will be appreciated that the stack of light diffuser film 114, the pair of prism films 116, 118 and the reflective polarizer film 120 may be added to the multiview backlight 100 of FIG. 1A, between the light guide 108 and the light-blocking layer 110.

Further, in some embodiments, a reflective film 122 may be placed adjacent to the back surface 108" of the light guide 108 to reflect any stray light back into the light guide and thereby 'recycle' stray light, as described in connection above with FIG. 1A. As with the two prism films 116, 118 and the reflective polarizer film 120, the reflective film 122 may provide enhanced brightness of the multiview backlight 100'.

Illumination may be provided by edge illumination or by back-side illumination. Edge illumination is illustrated in FIG. 1B, which shows a light source 124, such as a white light source, attached to an edge of the light guide 108. The white light may be provided by, for example, light emitting diodes (LEDs), organic LEDs, neon lamps, cold-cathode fluorescent lamps (CCFLs), and the like.

According to some embodiments of the principles described herein, a mode-switchable backlight is provided. The mode-switchable backlight may be employed in conjunction with a two-dimensional/three-dimensional (2D/3D) mode-switchable display, for example, to facilitate switching between displaying two-dimensional (2D) information in a 2D operational mode and three-dimensional (3D) information in a 3D operational mode, for example. The multiview backlight 100, 100' described above may be utilized in the mode-switchable backlight, according to some embodiments.

Specifically, as illustrated in FIGS. 2A-2B and 3A-3B, and in accordance with principles disclosed herein, a mode-switchable backlight 200, 300 is disclosed. In FIGS. 2A-2B and 3A-3B, the mode-switchable backlight 200, 300 comprises the multiview or '3D' backlight 100, 100' of FIGS. 1A-1B, respectively, including the planar backlight 102, now referred to as a first planar backlight 102. According to various embodiments, the mode-switchable backlight 200, 300 further comprises a second planar backlight 104. In the mode-switchable backlight 200, 300, the second planar backlight 104 is configured to provide diffuse light 106b (FIGS. 2B and 3B) at a light-emitting surface 104' of the second planar backlight 104 in the 2D operational mode.

Herein, there are described two, non-limiting, examples of the mode-switchable backlight. In a first example, illustrated in FIGS. 2A and 2B as the mode-switchable backlight 200, the first planar backlight 102 and the second planar backlight are separate from one another. When used in a 2D/3D mode-switchable display, the 2D image may be derived from light (i.e., diffuse light 106b) provided by the second planar backlight 104 and the 3D image may be derived from light (i.e., directional light beams 106a) provided by the separate first planar backlight 102. Thus, the first planar backlight 102 and the second planar backlight 104 are present as physically separate elements of the mode-switchable backlight 200 illustrated in FIG. 2A-2B. In a second example, illustrated in FIGS. 3A and 3B as the mode-switchable backlight 300, the first and second planar backlights 102, 104 are the same or substantially the same element, with ancillary elements, described herein, to distinguish portions thereof used respectively in each of the 2D operational mode and the 3D operational mode. Thus, the first planar backlight 102 and the second planar backlight 104 are combined in substantially one element of the mode-switchable backlight 300, as illustrated in FIGS. 3A-3B.

In both examples of the mode-switchable backlight 200, 300, the first planar backlight 102 is configured to provide a plurality of directional light beams 106a in the 3D operational mode. The first planar backlight 102 comprises a light guide 108 and a light-blocking layer 110 having a plurality of apertures 112, as described above in connection with the multiview backlight 100, 100'. The light-blocking layer 110 is adjacent to or on a surface of the light guide 108, with each aperture 112 of the plurality of apertures being configured to receive scattered light from the light guide 108 and to provide the plurality of directional light beams 106a from the received scattered light. In both examples, the light-blocking layer 110 with apertures 112 may be also be reflecting, as described above in connection with FIG. 1A. In other embodiments, the reflecting aspect of the light-blocking layer 110 may be absent, also as described above. For example, the light-blocking layer 110 may be absorptive or substantially absorptive.

Figure 2A:
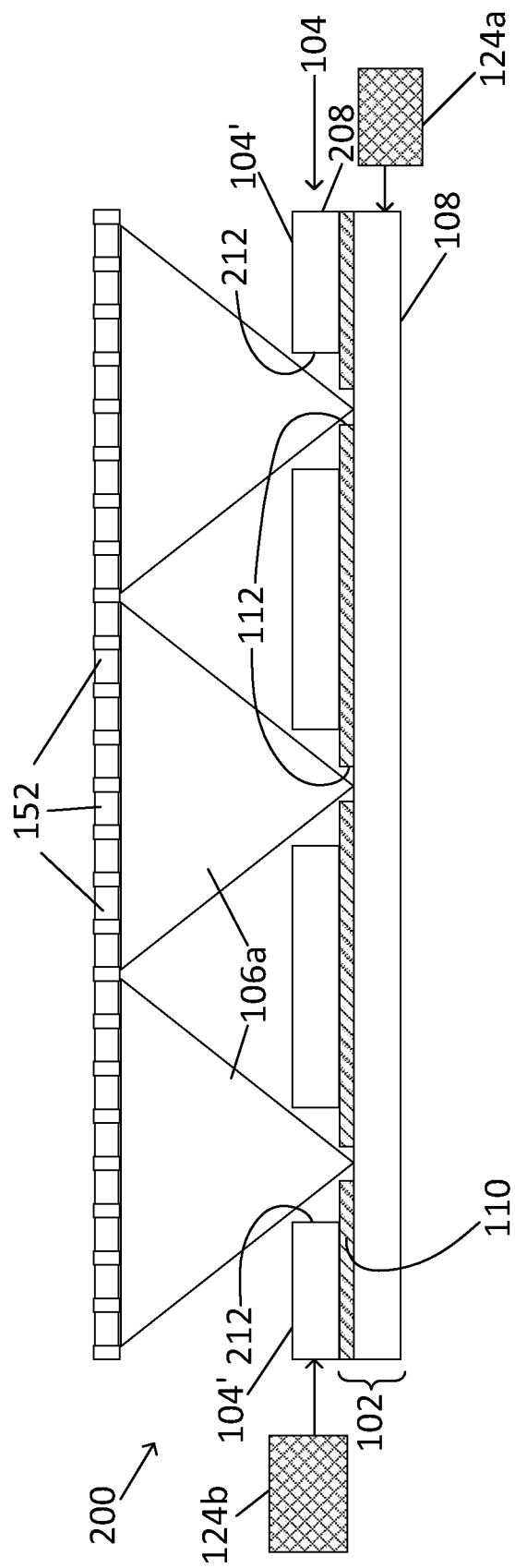
FIGS. 2A-2B illustrate a side view of a first example of a portion of a 2D/3D mode-switchable backlight, operating in 3D mode (FIG. 2A) and in 2D mode (FIG. 2B), according to an embodiment consistent with the principles described herein.
Figure 2B:
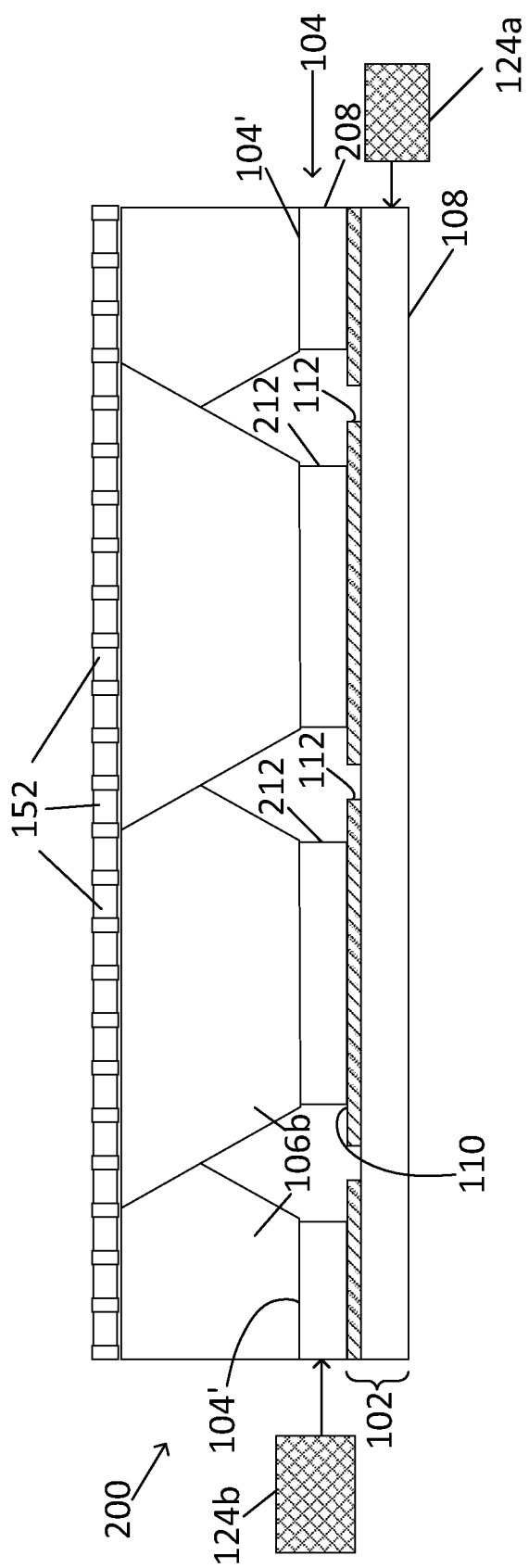
Figure 3B:
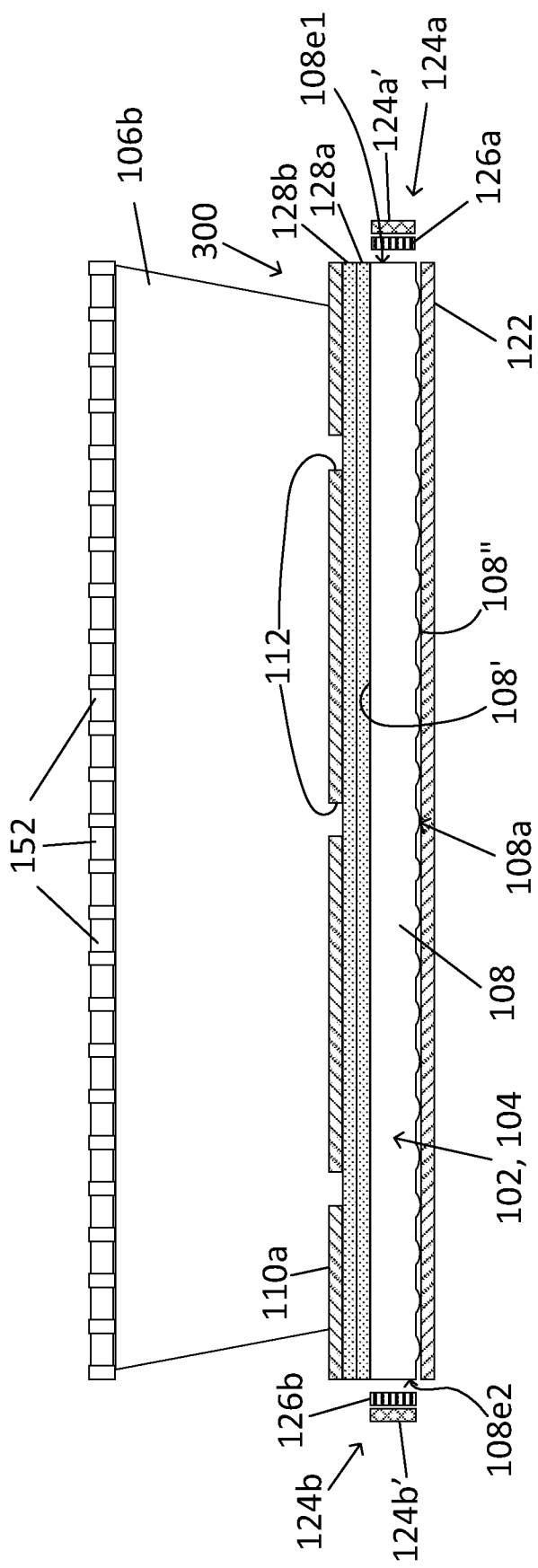

FIGS. 2A-2B depict the first example of a mode-switchable backlight 200, according to an embodiment consistent with the principles described herein. In particular, FIG. 2A illustrates operation in the 3D operational mode, while FIG. 2B illustrates operation in the 2D operational mode. In this first example, the second planar backlight 104 (for the 2D operational mode) comprises a light guide 208 that is separate from the light guide 108 of the first planar backlight 102 (for the 3D operational mode). The light guide 108 is configured to guide light provided by a first light source 124*a*, while the separate light guide 208 is configured to guide light provided by a second light source 124*b*. The light-blocking layer 110 with apertures 112 is disposed between the second planar backlight 104 and the first planar backlight 102, as illustrated. The first planar backlight 102 is configured to provide or emit directional light beams 106*a* through openings 212 in the second planar backlight 104, as described further below.

Both the light guides 208 and 108 of the mode-switchable backlight 200 may further include a light extraction feature, such as light extraction feature 108*a* shown in FIG. 1B. The light guide 208 is configured to scatter a portion of the guided light as scattered or diffuse light 106*b* (for the 2D operational mode). In addition to polarizers and prism films, the mode-switchable backlight 200 may further include a light diffuser to convert the scattered light from the light guide 208 into the diffuse light 106*b*. Light is selectively provided by the second light source 124*b* to the separate light guide 208 in the 2D operational mode. The light guide 108 is configured to emit a portion of the guided light as directional light beams 106*a* in the 3D operational mode. To reduce clutter in FIGS. 2A-2B, these elements (light extraction features 108*a*, reflective polarizer film 120, prism films 116, 118, and light diffuser film 114) are not illustrated in Figured 2A-2B, but are illustrated in FIG. 1B by way of example.

In the mode-switchable backlight 200 depicted in FIGS. 2A-2B, the second planar backlight 104 is located between the light-blocking layer 110 of the first planar backlight 102 and an array of light valves 152. The second planar backlight 104, which is configured to emit light from the light-emitting surface 104', has a plurality of openings 212 aligned with the apertures 112 of the aperture plurality. The openings 212 are configured to pass the directional light beams 106*a* from the apertures 112 through the second planar backlight 104 to the array of light valves 152. The openings 212 that align with the apertures 112 comprise openings through the second planar backlight 104 from the light-emitting surface 104' to an opposite surface of the second planar backlight adjacent to the light-blocking layer 110. While the openings 212 may comprise physical openings through the second planar backlight 104 in some embodiments, such as shown and described in FIGS. 2A-2B, alternatively the openings may be transparent regions that omit one or more scattering features of the second planar backlight 104, in other embodiments. As such, the openings may comprise 'optical openings,' as opposed to physical openings, as illustrated in FIGS. 2A-2B.

FIGS. 3A-3B illustrate the second example of a mode-switchable backlight 300, according to an embodiment consistent with the principles described herein. In particular, FIG. 3A illustrates operation in the 3D operational mode, while FIG. 3B illustrates operation in the 2D operational mode. In this second example, the first planar backlight 102 (for 3D operational mode) and the second planar backlight 104 (for 2D operational mode) are combined and the light guide 108 serves both operational modes. That is to say, the first planar backlight 102 and the second planar backlight 104 share a common light guide 108. In this example, the light-blocking layer 110 comprises a polarized light-blocking layer 110*a* with apertures 112 is disposed above the light-emitting surface of the combined first planar backlight 102 and second planar backlight 104. The mode-switchable backlight 300 of this second example relies on polarization to differentiate between operation in the 2D operational mode and operation in the 3D operational mode, according to various embodiments.

As illustrated in FIGS. 3A-3B, the first planar backlight 102 comprises the light guide 108 and the first light source 124*a*. Further, the first light source 124*a* is configured to provide light having a first polarization to the light guide 108 in the 3D operational mode. The first polarization may be provided by a first polarizer 126*a*, for example. According to various embodiments, the polarized light-blocking layer 110*a* is configured to be opaque (except at the apertures 112) to light of the first polarization. As such, only the apertures 112 in the polarized light-blocking layer 110*a* and not the polarized light-blocking layer 110*a* as a whole are configured to pass light of the first polarization (i.e., as the directional light beams 106*a*) that is scattered from the light guide 108. The opaqueness of the polarized light-blocking layer 110*a* to light having the first polarization may be provided by a polarization of the polarized light-blocking layer 110*a* being perpendicular to the first polarization of light, for example.

In FIGS. 3A-3B, the second planar backlight 104 comprises the light guide 108 (shared or combined with the first planar backlight 102) and the second light source 124*b*. The second light source 124*b* is configured to provide light having a second polarization to the light guide 108 in the 2D operational mode. For example, the second polarization may be provided by a second polarizer 126*b*. Further, the second polarization may be orthogonal to the first polarization, for example. According to various embodiments, the polarized light-blocking layer 110*a* is configured to be transparent to light of second polarization that is scattered from the light guide 108, but is otherwise opaque to the light of the first polarization. The transparency of the polarized light-blocking layer 110*a* to light of the second polarization may be provided by the polarization of the light-blocking layer 110*a* being the same as (e.g., parallel to) the polarization of light having the second polarization, for example. As before, the bottom, or back, surface 110' of the polarized light-blocking layer 110*a* may be reflective to aid in recycling light having the first polarization.

In an example, the first polarization is transverse magnetic (TM) and the second polarization is transverse electric (TE). Of course, the polarizations could be reversed, or exchanged, with first polarization being TE and the second polarization being TM. In either case, the polarization of the polarized light-blocking layer 110*a* is matched to the second or TE polarization of the light within the light guide or equivalently that is emanating from the combination of the second light source 124*b* and the second polarizer 126*b*. Similarly, the polarized light-blocking layer 110*a* has a polarization that is orthogonal to the first or TM polarization, in this example.

In FIGS. 3A-3B, the first light source 124*a* comprises an optical emitter 124*a*' and the first polarizer 126*a* at a first input edge 108*e*1 of the light guide 108. The second light source 124*b* comprises an optical emitter 124*b*' and the second polarizer 126*b*, disposed at a second input edge 108*e*2 of the light guide 108. As an example, the first polarizer 126*a* allows only TM light to pass into the light guide 108, while the second polarizer 126*b* allows only TE light to pass into the light guide 108.

The polarized light-blocking layer 110*a* comprises the light-blocking layer 110 that is patterned to provide the apertures 112 and that allows TE polarized light and reflects TM polarized light. In one embodiment, the first polarization is TM and the second polarization is TE, so that light of the first polarization is reflected and light of the second polarization is allowed. Alternatively, if the polarization of the light-blocking layer 110 were to be reversed and the first polarization were to be TE and the second polarization were to be TM, then the polarized light-blocking layer 110a would allow TM polarized light and reflect TE polarized light.

Continuing to refer to FIG. 3A, the polarized light-blocking layer 110a is opaque except at the apertures 112 to light of the first polarization that is scattered from the light guide 108. In the 3D operational mode, the scattered light of the first polarization, in turn, emerges as the directional light beams 106a from the mode-switchable backlight 300. Ultimately, the directional light beams 106a may be incident on light valves 152 of a light valve array (e.g., LCD elements), as also illustrated in FIG. 3A.

Alternatively, as illustrated in FIG. 3B, the second planar backlight 104 comprising the light guide 108 and the second light source 124b is configured to provide light having the second polarization to the light guide 108 in the 2D operational mode. The polarized light-blocking layer 110a is configured to be transparent to light of the second polarization that is scattered from the light guide 108. As such, in the 2D operational mode, the scattered light of the second polarization emerges as diffuse light 106b from the mode-switchable backlight 300. Further, the diffuse light 106b emitted by the scattering through the polarized light-blocking layer 110a ultimately may be incident on the array of light valves 152, as illustrated in FIG. 3B. As indicated above, diffuse light 106b is diffuse and may provide a 2D image, while the directional light beams 106a are directional and may provide a 3D image, e.g., when the mode-switchable backlight 300 is employed in conjunction with a 2D/3D mode-switchable display.

FIGS. 3A-3B further illustrate optional additional layers of the combined first and second planar backlights 102, 104. In particular, illustrated are a pair of prism films 116, 118, oriented 90 degrees with respect to each other. The pair of prism films 116, 118 may be provided between the light guide 108 and the polarized light-blocking layer 110a, as illustrated. The prism films 116, 118 may be substantially similar to those described above in relation to FIG. 1B.

In various embodiments, the 3D operational mode of the mode-switchable backlight 200, 300 of FIGS. 2A-3B may be activated by switching ON the first light source 124a. When the first light source 124a is activated, the first polarizer 126a allows only light having the first (e.g., TM) polarization to pass into the light guide 108 from the activated first light source 124a, e.g., by virtue of the first polarizer 126a. Then, due to the light extraction features 108a, this light having the first polarization may be directed or scattered out of the light guide 108 in the direction of the polarized light-blocking layer 110a with apertures 112 as the scattered light. Scattered light that aligns with the apertures 112 passes through as the directional light beams 106a and on to the light valves 152 of the light valve array. Other scattered light having the first polarization that is incident on the polarized light-blocking layer 110a that is not aligned with the apertures 112 is blocked or reflected back into the light guide 108, where it may pass through to the reflective film 122, for example. Upon reaching the reflective film 122, the reflected-back light of the first polarization may be further reflected once again toward the polarized light-blocking layer 110a, where if the reflected light aligns with the apertures 112 it will pass through to become the directional light beams 106a, and so on.

In various embodiments, the 2D operational mode may be activated by switching ON the second light source 124b (and switching OFF the first light source 124a). When the second light source 124b is activated, the second polarizer 126b only allows light of the second polarization (e.g., TE) to pass into the light guide 108 from the activated second light source 124b. Then, due to the light extraction features 108a, this light having the second polarization may be scattered or directed out of the light guide 108 in the direction of the polarized light-blocking layer 110a as scattered light. As indicted above, the polarized light-blocking layer 110a is configured to allow light having the second polarization to pass through, while blocking and reflecting light having the first polarization. As such, the scattered light of the second polarization directed toward the polarized light-blocking layer 110a will pass therethrough as diffuse light 106b. As illustrated in FIG. 3B, the diffuse light may be incident on the light valves 152 in the 2D operational mode.

Figure 4:
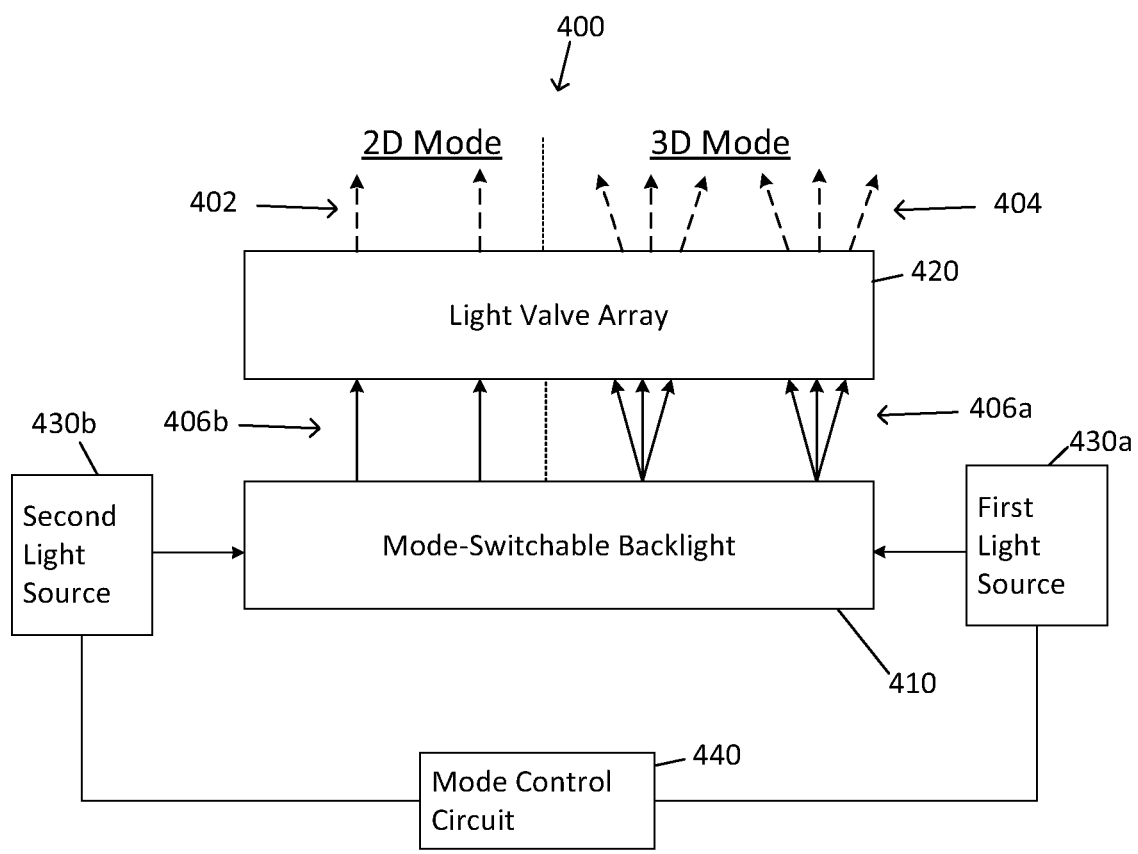
FIG. 4 illustrates a block diagram of a 2D/3D mode-switchable display in an example, according to an embodiment consistent with the principles described herein.

According to some embodiments of the principles described herein, a two-dimensional/three dimensional (2D/3D) mode-switchable display is provided. FIG. 4 illustrates a block diagram of a 2D/3D mode-switchable display 400 in an example, according to an embodiment consistent with the principles described herein. According to various embodiments, the 2D/3D mode-switchable display 400 may be used to present either or both of 2D information and 3D information. The 2D information may include, but not limited to, 2D images and text, while the 3D information may include, but is not limited to, multiview or 3D images. In particular, the 2D/3D mode-switchable display 400 illustrated in FIGS. 4A and 4B is configured to emit modulated light 402 representing 2D pixels. The modulated light 402 representing 2D pixels may be emitted in a 2D operational mode of the 2D/3D mode-switchable display 400, for example. Further, as illustrated in FIG. 4, the 2D/3D mode-switchable display 400 is configured to emit modulated light beams 404 having different principal angular directions from one another and representing 3D pixels corresponding to the different views of the 2D/3D mode-switchable display 400 in a 3D operational mode. In some embodiments, the modulated light 402 and the modulated light beams 404 may further represent different colors, and the 2D/3D mode-switchable display 400 may be a color electronic display.

Note that FIG. 4 illustrates both the modulated light 402 and the modulated light beams 404 being emitted in different regions of the mode-switchable display 400 labeled respectively as '2D mode' and '3D mode,' for ease of illustration. This is to illustrate that the 2D operational mode and 3D operational mode may be selectively activated in the 2D/3D mode-switchable display 400 to provide both 2D information and 3D information simultaneously, according to some embodiments. It should be understood that the 2D/3D mode-switchable display 400 may also be configured to selectively operate exclusively in or to be selectively switched between either of the 2D operational mode or the 3D operational mode, according to various embodiments.

As illustrated in FIG. 4, the 2D/3D mode-switchable display 400 comprises a mode-switchable backlight 410. The mode-switchable backlight 410 is configured to provide a plurality of directional light beams 406a in the 3D operational mode. Further, the mode-switchable backlight 410 is configured to provide diffuse light 406b in the 2D operational mode. In some embodiments, the mode-switchable backlight 410 may be substantially similar to the mode-switchable backlight 200 of the first example, described above and illustrated in FIGS. 2A-2B. In other embodiments, the mode-switchable backlight 410 of the 2D/3D mode-switchable display 400 may be substantially similar to the mode-switchable backlight 300 of the second example, described above and illustrated in FIGS. 3A-3B. Moreover, the plurality of directional light beams 406a provide by the mode-switchable backlight 410 of the 2D/3D mode-switchable display 400 in the 3D operational mode may be substantially similar to plurality of directional light beams 106a variously described above with respect to the multiview backlight 100, 100' and the mode-switchable backlight 200, 300, according to some embodiments. Similarly, the diffuse light 406b provided by the mode-switchable backlight 410 may be substantially similar to the diffuse light 106b described above with respect to the mode-switchable backlight 200, 300.

According to various embodiments, the mode-switchable backlight 410 comprises a light guide configured to guide light and further to scatter the guided light as scattered light. In some embodiments, the light guide of the mode-switchable backlight 410 may be substantially similar to the light guide 108 described above, e.g., light guide 108 of the above-described mode-switchable backlight 200, 300 as well as the light guide 108 illustrated in FIGS. 1A-1B, for example. The guided light may be substantially similar to the guided light 101 described above with respect to the multiview backlight 100, for example.

The mode-switchable backlight 410 further comprises a light-blocking layer having a plurality of apertures. The light-blocking layer may be on or adjacent to a first surface of the light guide, according to various embodiments. Each aperture of the aperture plurality is configured to receive the scattered light from the light guide and to provide the plurality of directional light beams 406a in the 3D operational mode. In some embodiments, the light-blocking layer may be a reflective light-blocking layer. In some embodiments, the light-blocking layer may be a polarized light-blocking layer. Further, a size of the apertures may be comparable to (e.g., between 50 percent and 200 percent of) a size of a light valve of a light valve array or equivalently a sub-pixel of multiview pixel of the 2D/3D mode-switchable display 400.

For example, in some embodiments, the light-blocking layer of the mode-switchable backlight 410 illustrated in FIG. 4 may be substantially similar to the light-blocking layer 110 of either the multiview backlight 100, 100' or the mode-switchable backlight 200. Similarly, the apertures may be substantially similar to the apertures 112 variously described above. In these embodiments, light guide and light-blocking layer are or function as a first planar backlight to provide the plurality of directional light beams 406a in the 3D operational mode. The first planar backlight may be substantially similar to the first planar backlight 102 described above with respect to the mode-switchable backlight 200, in some embodiments.

In these embodiments, the mode-switchable backlight 410 may further comprise a second planar backlight configured to provide diffuse light in the 2D operational mode. The second planar backlight may have a plurality of openings aligned with the apertures of the plurality of apertures of the light-blocking layer. The openings are configured to enable the plurality of directional light beams 406a to pass through the second planar backlight in the 3D operational mode. In some embodiments, the second planar backlight may be substantially similar to the second planar backlight 104 of the mode-switchable backlight 200, described above and illustrated in FIG. 2A-2B.

In particular, the second planar backlight may comprise a light guide that is separate from the light guide of the first planar backlight. The light guide of the second planar backlight is configured to guide light provided by a light source as guided light. In some embodiments, the second planar backlight may further comprise a light extraction feature configures to scatter out of the light guide a portion of guided light as scattered light. In some embodiments, the second planar backlight may further comprise a light diffuser to convert the scattered light into diffuse light. The diffuse light may be provided as the diffuse light 406b in the 2D operational mode, for example.

In other embodiments, the light-blocking layer of the mode-switchable backlight 410 illustrated in FIG. 4 may be substantially similar to the polarized light-blocking layer 110a of the above-described, mode-switchable backlight 300 illustrated in FIGS. 3A-3B. In particular, the light-blocking layer having the plurality of apertures may be configured to block light of a first polarization (e.g., TM or TE, respectively), while passing light of a second polarization (e.g., TE or TM respectively). Thus, in the 3D operational mode, light of the first polarization that is scattered from the light guide (e.g., by a scattering feature of the light guide) is blocked by the light-blocking layer, except at the apertures. Further, the scattered light that is coincident with the apertures is emitted as the plurality directional light beams 406a, during the 3D operational mode. Alternatively during the 2D operational mode, light of the second polarization that is scattered from the light guide is emitted through the light-blocking layer as diffuse light 406b. As such, the apertures do not play a role in emitting the diffuse light 406b.

In these other embodiments, the light guide of the mode-switchable backlight 410 is shared between both operational modes and selective control of a polarization of light (i.e., scattered light polarization) is employed to distinguish between the 2D operational mode and the 3D operational mode, i.e., light polarization within the light guide determines whether the plurality of directional light beams 406a or the diffuse light 406b is emitted. In some of these embodiments, the mode-switchable backlight 410 may be substantially similar to the combined first planar backlight 102 and the second planar backlight 104, as described above with respect to the mode-switchable backlight 300, in which the light guide 108 served in both the 2D operational mode and the 3D operational mode.

As illustrated in FIG. 4, the 2D/3D mode-switchable display 400 further comprises a light valve array 420. The light valve array 420 is configured to modulate the diffuse light 406b in the 2D operational mode. The diffuse light 406b modulated by the light valve array 420 is emitted by the light valve array 420 as the modulated light 402 representing 2D pixels. The 2D pixels may be pixels of a 2D image, for example. Further, the light valve array 420 is configured to modulate directional light beams 406a of the directional light beam plurality in the 3D operational mode. The directional light beams 406a modulated by the light valve array 420, in turn, are the modulated light beams 404 having different principal angular directions from one another and representing 3D pixels, i.e., directional pixels having directions of different view directions of a multiview image. In particular, the 3D pixels may correspond to the different views of a multiview or 3D image displayed by the 2D/3D mode-switchable display 400 in the 3D operational mode. In some embodiments, the light valve array 420 may be substantially similar to the array of light valves 152 described herein above. For example, various different types of light valves may be employed as the light valves of the light valve array 420 including, but not limited to, one or more of liquid crystal light valves, electrophoretic light valves, and light valves based on electrowetting.

In some embodiment (e.g., as illustrated in FIG. 4), the 2D/3D mode-switchable display 400 further comprises light source configured to provide light to be scattered from or otherwise emitted by the mode-switchable backlight 410. In particular, FIG. 4 illustrates a first light source 430a and a second light source 430b arranged to provide light to the mode-switchable backlight 410. In some embodiments, the first light source 430a may be substantially similar to the first light source 124a and the second light source 430b may be substantially similar to the second light source 124b, each of which is described above with reference to FIGS. 2A-3B as well as the mode-switchable backlight 200, 300. According to various embodiments, switching between providing light to the mode-switchable backlight 410 may be employed to switch modes of the 2D/3D mode-switchable display 400.

In embodiments of the 2D/3D mode-switchable display 400 where the mode-switchable backlight 410 includes separate first and second planar backlights, the first light source 430a may be optically coupled to the first planar backlight, while the second light source 430b may be optically coupled to the second planar backlight. For example, the first and second light source 430a, 430b may be may be connected respectively to the separate first and second planar backlights of the mode-switchable backlight 410 in a configuration that is substantially similar to the connections between the first and second light source 124a, 124b and respective, separate first and second planar backlights 102, 104, as described above and illustrated in FIGS. 2A-2B.

In the 3D operational mode, the first light source 430a may be activated to provide light to the light guide of the first planar backlight. The light provided by the first light source 430a may then be scattered and ultimately emitted by the apertures of the light-blocking layer as the plurality of directional light beams 406a. The second light source 430b may be de-activated during the 3D operational mode to insure that diffuse light 406b is not produced to interfere with the plurality of directional light beams 406a. Alternatively, in the 2D operational mode, the second light source 430b may be activated to provide light to the light guide of the second planar backlight. In turn, the light provided by the second light source 430b may be scattered from the light guide of the second planar backlight as the diffuse light 406b during the 2D operational mode.

In other embodiments of the 2D/3D mode-switchable display 400 where the mode-switchable backlight 410 includes a combined first and second planar backlight and a polarized light-blocking layer, the first light source 430a and the second light source 430b may be optically coupled to and thus configured to provide light to the light guide of the mode-switchable backlight 410 (i.e., a common light guide of the combined first and second planar backlights). Further, the first light source 430a may be configured to provide light having the first polarization (e.g., TM or TE) and the second light source 430b may be configured to provide light having the second polarization (e.g., TE or TM). In some embodiments, these first and second light sources 430a, 430b may be substantially similar to the first and second light sources 124a, 124b and light guide 108 of the above-described mode-switchable backlight 300. In particular, each of the first and second light sources 430a, 430b may include a polarizer to polarize light emitted or provided by the respective light source. Further, connections between the first and second light sources 430a, 430b configured to provide different polarizations and the light guide of the mode-switchable backlight 410 of these embodiments may be substantially similar to the connections of the light guide 108 and first and second light sources 124a, 124b illustrated in FIGS. 3A-3B, for example.

The 2D/3D mode-switchable display 400, as illustrated in FIG. 4, further comprises a mode control circuit 440. The mode control circuit 440 is configured to selectively control 2D/3D mode switching by the 2D/3D mode-switchable display 400. In particular, the mode control circuit 440 may selectively control 2D/3D mode switching by switching the first and second light sources 430a, 430b. For example, the mode control circuit 440 may be configured to switch ON the first light source 430a and to switch OFF the second light source 430b to implement (or during) the 3D operational mode. Further, the mode control circuit 440 may be configured to switch OFF the first light source 430a and to switch ON the second light source 430b to implement (or during) the 2D operational mode. The switching of the first and second light sources 430a, 430b may be controlled manually, or, more commonly, by software configured to perform the switching by providing control inputs to the mode control circuit 440, according to various embodiments.

Figure 5:
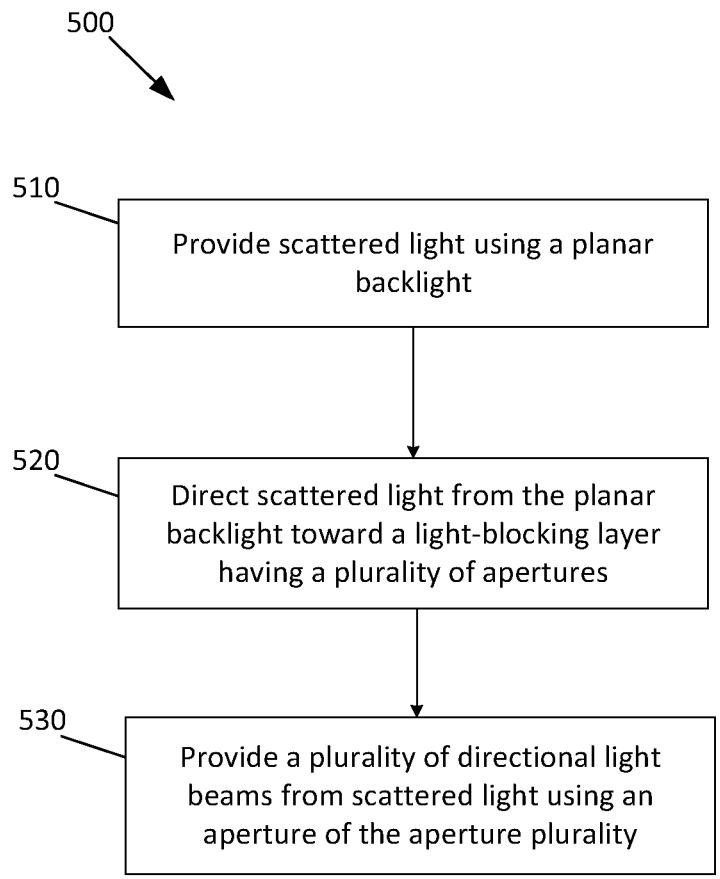
FIG. 5 illustrates a flow chart of a method of backlight operation in an example, according to an embodiment consistent with the principles described herein.

According to various embodiments of the principles described herein, a method of backlight operation is provided. FIG. 5 illustrates a flow chart of a method 500 of backlight operation in an example, according to an embodiment consistent with the principles described herein operation. As illustrated, the method 500 of backlight operation comprises providing 510 scattered light using a planar backlight. In some embodiments, the planar backlight may be substantially similar to the first planar backlight 102 described above with respect to the mode-switchable backlight 200, 300. The method 500 of backlight operation further comprises directing 520 light from the planar backlight toward a light-blocking layer having a plurality of apertures. In some embodiments, the light-blocking layer may be substantially similar to the light-blocking layer 110, 110a with apertures 112, described above with respect to the mode-switchable backlight 200, 300. For example, the light-blocking layer may be a reflective light-blocking layer. In another example, the light-blocking layer may be a polarized light-blocking layer (e.g., either reflective or non-reflective).

The method 500 of backlight operation further comprises providing 530 a plurality of directional light beams from the scattered light using an aperture of the aperture plurality. In some embodiments, the provided 530 plurality of directional light beams may be substantially similar to the plurality of directional light beams 106a, 406a described hereinabove. For example, the plurality of directional light beams may comprise directional light beams having directions corresponding to view directions of a multiview display. According to various embodiments, a size of the aperture is comparable to a light valve of a light valve array of a display in which the backlight is employed. For example, the backlight may be multiview backlight employed in a multiview display. The multiview backlight of the method 500 of backlight operation may be substantially similar to the multiview backlight 100, 100' described above, for example.

In some embodiments (not illustrated), the method 500 of backlight operation further comprises providing diffuse light during a two-dimensional (2D) operational mode. The plurality of directional light beams may be provided 530 during a three-dimensional (3D) operational mode, for example. In these embodiments, the backlight may be a 2D/3D mode-switchable backlight. Further, as a 2D/3D mode-switchable backlight, the backlight may be substantially similar to the mode-switchable backlight 200, 300, described above, in some embodiments. In particular, in some embodiments the diffuse light is provided by another planar backlight located between the light-blocking layer and the light valve array of the display.

In some embodiments (e.g., where the light-blocking layer is a polarized light-blocking layer), the light-blocking layer may be configured to block or at least substantially block transmission of light having a first polarization. In these embodiments, the plurality of directional light beams is provide by illuminating a light guide adjacent to the light-blocking layer with light polarized according to the first polarization. Further in these embodiments, the light-blocking layer may be configured to transmit light having a second polarization. The diffuse light may be provided during the 2D operational mode by illuminating the light guide with light polarized according to the second polarization, for example.

According to some embodiments (not illustrated), the method 500 of backlight operation further comprises modulating directional light beams of the directional light beam plurality using the light valve array in the 3D operational mode. The modulated directional light beams may provide directional pixels of a multiview image. In particular, the modulated directional light beams may be substantially similar to the modulated light beams 404 of the 2D/3D mode-switchable display 400 described above, according to some embodiments. Further, according to some embodiments (not illustrated), the method 500 of backlight operation may further comprise modulating the diffuse light in the 2D operational mode to provide pixels of a 2D image. As such, the backlight of method 500 may be a 2D/3D mode-switchable backlight of a 2D/3D mode-switchable display 35 (e.g., the mode-switchable backlight 410 of the 2D/3D mode-switchable display 400), in some embodiments.

Thus, there have been described examples and embodiments of a multiview backlight, 2D/3D mode-switchable backlight, a 2D/3D mode-switchable display, and a method of backlight operation that employ a light-blocking layer having a plurality of apertures adjacent to a surface of a planar backlight. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multiview mode-switchable backlight comprising:
    a first planar light guide configured to guide first light provided by a first light source as first guided light;
    a first light extraction feature configured to scatter out of the first light guide a portion of the first guided light as first scattered light;
    a light-blocking layer having a plurality of apertures adjacent to a surface of the first planar light guide, the apertures of the plurality of apertures being configured to allow a portion of the first scattered light to pass through the light-blocking layer as a plurality of directional light beams;
    a second planar light guide configured to guide second light provided by a second light source as second guided light, the light-blocking layer being located between the first planar light guide and the second planar light guide, the second planar light guide having a plurality of openings aligned with the apertures of the plurality of apertures, the openings being configured to pass the directional light beams through the second planar light guide; and
    a second light extraction feature configured to scatter out of the second light guide a portion of the second guided light as diffuse light.

2. The mode-switchable backlight of claim 1, wherein the plurality of directional light beams comprises directional light beams having directions corresponding to view directions of a multiview display.

3. The mode-switchable backlight of claim 1, wherein the light-blocking layer is a reflective light-blocking layer.

4. The mode-switchable backlight of claim 1, wherein a size of an aperture is between fifty percent and two hundred percent of a size of a sub-pixel in a multiview pixel of a multiview display.

5. The mode-switchable backlight of claim 1, further comprising:
    an array of light valves configured to modulate the plurality of directional light beams in a three-dimensional (3D) operational mode to provide a 3D image and to modulate the diffuse light in a two-dimensional (2D) operational mode to provide a 2D image.

6. The mode-switchable backlight of claim 1, further comprising a mode control circuit configured to switch the mode-switchable backlight between a three-dimensional (3D) operational mode and a two-dimensional (2D) operational mode,
    wherein in the 3D operational mode, the mode control circuit is configured to power the first light source but not the second light source such that the plurality of directional light beams forms an output of the mode-switchable backlight; and
    wherein in the 2D operation mode, the mode control circuit is configured to power the second light source but not the first light source such that the diffuse light beams form the output of the mode-switchable backlight.

7. A two-dimensional/three-dimensional (2D/3D) mode-switchable display comprising:
    a mode-switchable backlight configured to provide a plurality of directional light beams in a three-dimensional (3D) operational mode and to provide diffuse light in a two-dimensional (2D) operational mode, the mode-switchable backlight comprising:
        a first planar light guide configured to guide first light provided by a first light source as first guided light;
        a first light extraction feature configured to scatter out of the first light guide a portion of the first guided light as first scattered light;
        a light-blocking layer having a plurality of apertures adjacent to a surface of the first planar light guide, the apertures of the plurality of apertures being configured to allow a portion of the first scattered light to pass through the light-blocking layer as the plurality of directional light beams;
        a second planar light guide configured to guide second light provided by a second light source as second guided light, the light-blocking layer being located between the first planar light guide and the second planar light guide, the second planar light guide having a plurality of openings aligned with the apertures of the plurality of apertures, the openings being configured to pass the directional light beams through the second planar light guide; and a second light extraction feature configured to scatter out of the second light guide a portion of the second guided light as the diffuse light; and a light valve array configured to modulate the diffuse light in the 2D operational mode and to modulate directional light beams of the directional light beam plurality in the 3D operational mode.

8. The 2D/3D mode-switchable display of claim 7, wherein a size of an aperture of the plurality of apertures is between fifty percent and two hundred percent of a size of a light valve of the light valve array.

9. The 2D/3D mode-switchable display of claim 7, further comprising a mode control circuit configured to switch the mode-switchable backlight between a three-dimensional (3D) operational mode and a two-dimensional (2D) operational mode, wherein in the 3D operational mode, the mode control circuit is configured to power the first light source but not the second light source such that the plurality of directional light beams forms an output of the mode-switchable backlight; and wherein in the 2D operation mode, the mode control circuit is configured to power the second light source but not the first light source such that the diffuse light beams form the output of the mode-switchable backlight.

10. The 2D/3D mode-switchable display of claim 7, wherein the light-blocking layer is a reflective light-blocking layer.

11. The 2D/3D mode-switchable display of claim 7, further comprising a reflective film on a surface of the first planar light guide opposite to a surface adjacent to the light-blocking layer, the reflective film being configured to reflect stray light back into the first planar light guide and to recycle the stray light.

12. A method of backlight operation, the method comprising:

guiding first light provided by a first light source in a first planar light guide as first guided light;

scattering out of the first light guide a portion of the first guided light as first scattered light;

directing the first scattered light toward a light-blocking layer having a plurality of apertures adjacent to a surface of the first planar light guide;

allowing a portion of the scattered light to pass through the apertures of the plurality of apertures to pass through the light-blocking layer as a plurality of directional light beams; and directing the plurality of directional light beams through a second planar light guide, the light-blocking layer being located between the first planar light guide and the second planar light guide, the second planar light guide having a plurality of openings aligned with the apertures of the plurality of apertures, the openings being configured to pass the directional light beams through the second planar light guide.

13. The method of backlight operation of claim 12, wherein the plurality of directional light beams comprises directional light beams having directions corresponding to view directions of a multiview display.

14. The method of backlight operation of claim 12, further comprising:

guiding second light provided by a second light source in the second planar light guide as second guided light; and scattering out of the second light guide a portion of the second guided light as diffuse light, wherein the diffuse light is provided during a two-dimensional (2D) operational mode, the plurality of directional light beams are provided during a three-dimensional (3D) operational mode, and the backlight is a 2D/3D mode-switchable backlight.

15. The method of backlight operation of claim 14, further comprising modulating directional light beams of the directional light beam plurality using the light valve array in the 3D operational mode to provide directional pixels of a multiview image and modulating the diffuse light in the 2D operational mode to provide pixels of a 2D image, wherein the backlight is a 2D/3D mode-switchable backlight of a 2D/3D mode-switchable display.

\* \* \* \* \*